US00RE38294E

(19) United States
(12) Reissued Patent
Nattel et al.

(10) Patent Number: US RE38,294 E
(45) Date of Reissued Patent: Nov. 4, 2003

(54) CONNECTOR FOR ARMORED ELECTRICAL CABLE

(75) Inventors: William Nattel, Montreal (CA); Alain Michaud, St. Luc (CA)

(73) Assignee: Thomas & Betts Corporation, Memphis, TN (US)

(21) Appl. No.: 09/901,538

(22) Filed: Jul. 9, 2001

Related U.S. Patent Documents

Reissue of:
(64) Patent No.: 6,034,325
Issued: Mar. 7, 2000
Appl. No.: 08/931,181
Filed: Sep. 16, 1997

(51) Int. Cl.[7] ..... H01R 13/46
(52) U.S. Cl. ..... 174/59; 174/65 R; 174/65 SS; 439/584
(58) Field of Search ..... 174/152 G, 59, 174/65 R, 65 SS, 51, 65 G, 151, 135, 153 G, 78; 439/583, 584, 462, 581

(56) References Cited

U.S. PATENT DOCUMENTS

| | | | | | |
|---|---|---|---|---|---|
| 2,693,374 | A | * | 11/1954 | Wurzberger | 285/122 |
| 3,009,722 | A | * | 11/1961 | Augustin | 288/22 |
| 3,492,410 | A | * | 1/1970 | Kelly | 174/78 |
| 3,567,843 | A | * | 3/1971 | Collins et al. | 174/51 |
| 3,610,639 | A | * | 10/1971 | Staats, Jr. | 277/608 |
| 4,090,029 | A | * | 5/1978 | Lundeberg | 174/51 |
| 4,525,000 | A | * | 6/1985 | Bachle | 285/148.23 |
| 4,544,800 | A | * | 10/1985 | Katsuura | 174/65 SS |
| 4,547,623 | A | * | 10/1985 | Van Brunt et al. | 174/35 R |
| 4,549,037 | A | * | 10/1985 | Bawa et al. | 174/65 SS |
| 4,549,755 | A | * | 10/1985 | Kot et al. | 285/341 |
| 4,814,547 | A | * | 3/1989 | Riley et al. | 174/65 SS |
| 4,877,271 | A | * | 10/1989 | McCorkle et al. | 285/39 |
| 5,056,799 | A | * | 10/1991 | Takenaka et al. | 277/562 |
| 5,059,747 | A | * | 10/1991 | Bawa et al. | 174/65 SS |
| 5,208,427 | A | * | 5/1993 | Couto et al. | 174/65 SS |
| 5,295,851 | A | * | 3/1994 | Bawa et al. | 439/273 |
| 5,310,359 | A | * | 5/1994 | Chadbourne et al. | 439/462 |
| 5,321,205 | A | * | 6/1994 | Bawa et al. | 174/65 SS |
| 5,456,614 | A | * | 10/1995 | Szegda | 439/321 |
| 5,321,205 | A | * | 2/1997 | Bawa et al. | 174/65 SS |
| 5,763,833 | A | * | 6/1998 | Bawa et al. | 174/65 SS |
| 5,866,853 | A | * | 2/1999 | Sheehan | 174/65 SS |
| 6,100,470 | A | * | 8/2000 | Gretz | 174/59 |
| 6,102,738 | A | * | 8/2000 | Macek et al. | 439/584 |
| 6,268,565 | B1 | * | 7/2001 | Daoud | 174/65 R X |

FOREIGN PATENT DOCUMENTS

| | | | |
|---|---|---|---|
| DE | 2458867 | * | 6/1976 |
| EP | 0515200 A1 | * | 11/1992 |
| GB | 390897 | * | 4/1933 |
| GB | 1329620 | * | 9/1973 |
| GB | 2060281 A | * | 4/1981 |
| GB | 2102637 | * | 2/1983 |
| GB | 2106336 A | * | 4/1983 |
| GB | 2258567 | * | 2/1993 |
| SU | 1112462 | * | 9/1984 |

OTHER PUBLICATIONS

TEK Teck Cable Connectors, Comander Electrical Materials; pp. 60–61, Jun. 1992.*

* cited by examiner

*Primary Examiner*—Dean A. Reichard
*Assistant Examiner*—Dhiru R. Patel
(74) *Attorney, Agent, or Firm*—Hoffman & Baron, LLP

(57) ABSTRACT

A connector for an armored cable including a connector body having an opening extending therethrough and a gland nut telescopically engageable with the connector body. The gland nut has an aperture for receiving the armored cable. The connector further includes a sealing ring positionable within the gland nut and has an inner annular surface engageable with the armored cable for sealing about same on an opposed outer annular surface. The sealing ring includes an annular groove formed about an outer surface thereof, and the groove permits the sealing ring to diametrically contract upon linear compression of the sealing ring. In addition, an isolating device is provided that is positionable about the sealing ring for frictionally isolating the sealing ring from the gland nut and permitting the gland nut to rotate substantially independently of the sealing ring.

39 Claims, 4 Drawing Sheets

CONNECTOR FOR ARMORED ELECTRICAL CABLE

Matter enclosed in heavy brackets [ ] appears in the original patent but forms no part of this reissue specification; matter printed in italics indicates the additions made by reissue.

FIELD OF THE INVENTION

The present invention relates to a connector for electrical cables and, more particularly, to a connector for attaching armored electrical cables to enclosures.

BACKGROUND OF THE INVENTION

Armored electrical cables may be used in a wide variety of applications. They are particularly suited for environments in which it is essential for the wiring to be isolated from the surrounding environment. The conventional construction of such cable permits it to be used in environments which are referred to as hazardous locations. Such locations had traditionally been serviced with rigid metal conduit. In recent years, however, when permitted by applicable electrical code, armored cable may be used in place of rigid conduit. Rigid conduit is typically more difficult and more expensive to install than armored cable, therefore, it is desirable to use such cable when permitted.

Armored cable typically includes an electrically conductive flexible metal casing which protects the conductors running within from abrasion, impacts and the like. In addition, the metal casing permits the cable to be grounded throughout its length. An outer plastic or rubber sheath typically covers the metal casing thereby adding water proof protection to the cable as well as protecting the metal sheathing from corrosive elements.

When armored cables are connected to, or terminated in, metal enclosures, special connectors are typically employed. As is usually required by the applicable electrical code, such connectors provide electrical grounding continuity between the flexible metal casing and the enclosures. In addition, such connectors provide adequate physical retention of the cable and sealing moisture and dust from the enclosure.

Existing armored cable connectors are typically bulky in size. Such connectors often have numerous parts making the connector expensive to manufacture and time consuming to install. In addition, cable connectors typically can only accommodate a limited range of cable sizes. This requires a manufacturer to produce a wide variety of connectors in order to have a suitable connector available to accommodate the wide range of commercially available armored cables. Additionally, prior art armored cable connectors typically have two portions, a connector body and gland nut, which are threadedly engaged. As the two portions are threaded together, the armored cable has a tendency to twist.

Prior art armored cable connectors typically employ an elastomeric O-ring in order to provide the necessary sealing between the outer diameter of the cable and the connector. Such a design contributes to the two significant problems set forth above. The O-rings typically have an inside diameter substantially similar to the outside diameter of the cable and an outside diameter similar to the inside diameter of the connector piece in which it is disposed. When the connector body and gland nut are threaded together, the O-ring is deformed into forced sealing engagement with the cable. However, since an O-ring may only be slightly diametrically contracted without being damaged, only a narrow range of cable size may be accommodated by a particular connector.

Additionally, as the gland nut portion of the connector is rotated onto the body portion of the connector and the O-ring begins to engage the cable, a torque is applied to the cable causing it to rotate. This rotation of the cable may result in its being damaged especially its outer sheathing.

Accordingly, there is a need for an armored cable connector which is capable of accommodating a wide range of cable sizes and which does not rotate the cable upon securing the connector components.

SUMMARY OF THE INVENTION

It is an object of the present invention to provide a connector for securing armored cable.

It is a further object of the present invention to provide a connector having a body portion, gland nut and a sealing ring for sealing about an armored cable.

It is still a further object of the present invention to provide a connector having a friction isolation device surrounding the sealing ring for preventing the transmission of torque from the gland nut to the cable when the gland nut is treaded onto the body.

It is yet a further object of the invention to provide a connector having a sealing ring with a U-shaped groove annularly extending about an outer surface of the sealing ring.

In the efficient attainment of these and other object, the present invention provides a connector for an armored cable including a connector body having a generally longitudinal opening extending therethrough and having a first end, a gland nut telescopically engageable with the first end of the connector body, the gland nut having a first end, the gland nut first end having an aperture for receiving the armored cable. The connector further includes a sealing ring positionable within the gland nut and having an inner annular surface engagable with the armored cable for seating about same on an opposed outer annular surface. The sealing ring has an annular groove formed about an outer surface thereof, and the groove permits the sealing ring to diametrically contract upon linear compression of the sealing ring. In addition an isolating device is provided that is positionable about the sealing ring for frictionally isolating the sealing ring from the gland nut and permitting the gland nut to rotate substantially independently ofthe sealing ring.

DETAILED DESCRIPTION OF THE PREFERRED EMBODIMENTS

Figure 1:
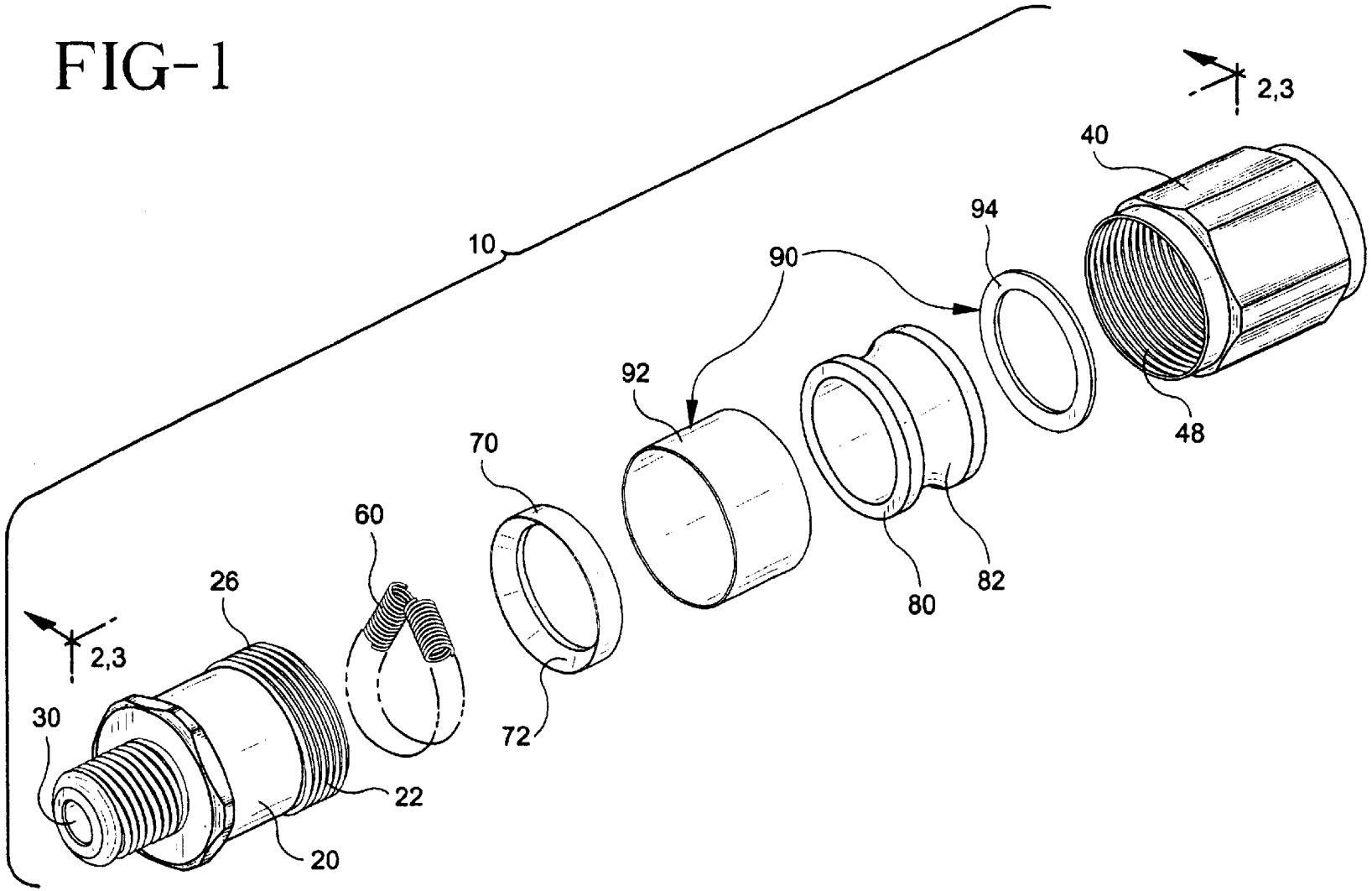
FIG. 1 is an exploded perspective view of the able connector of the present invention.
Figure 2:
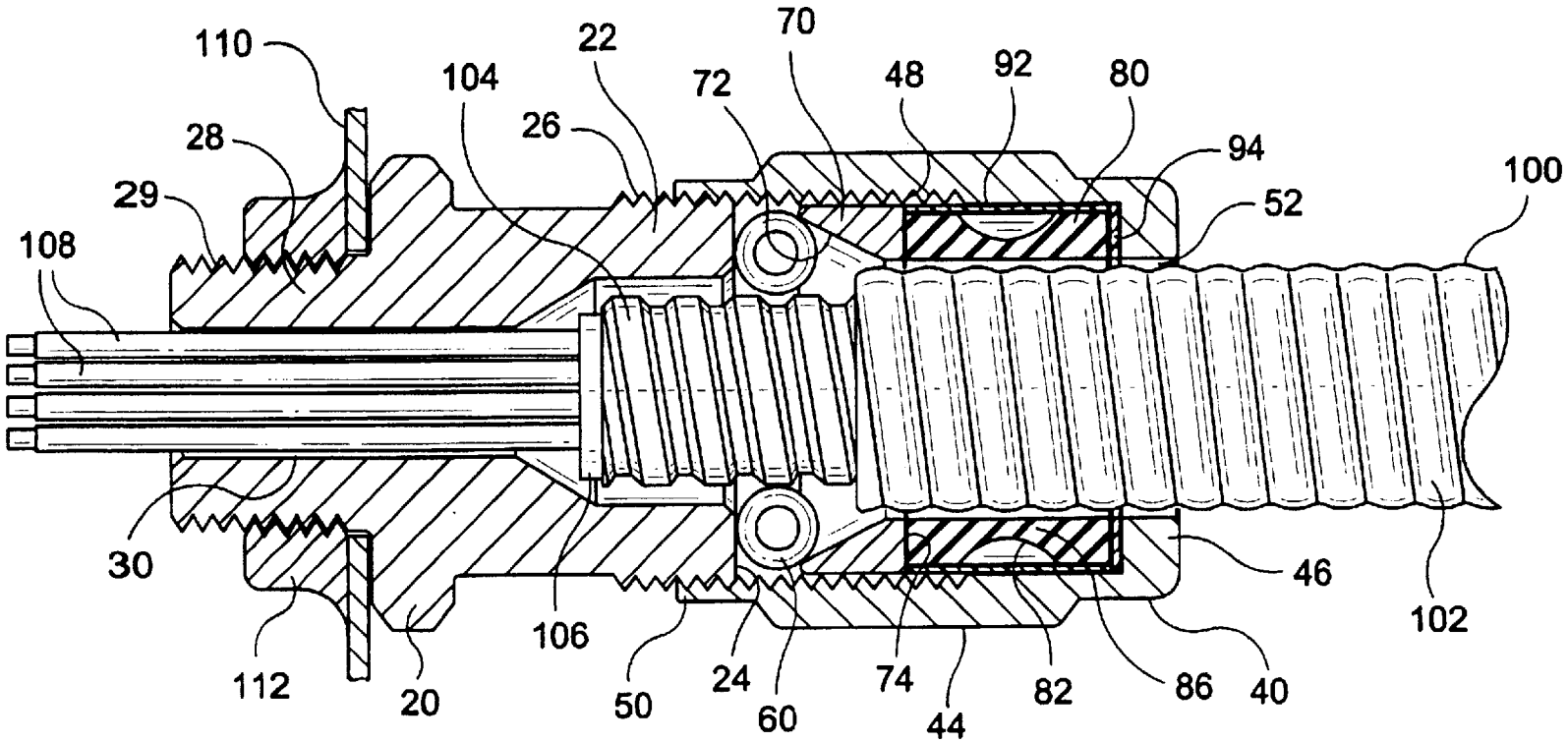
FIG. 2 is a cross-sectional view of the connector of FIG. 1 showing the connector in the unsecured position.

Referring to FIGS. 1 and 2, armored cable connector 10 of the present invention is shown. Connector 10 includes, a connector body 20, gland nut 40, electrically conductive spring 60, beveled washer 70, sealing ring 80 and sealing ring isolation assembly 90. Connector 10 is used to secure an armored cable 100 to an enclosure or other structure 110 and is capable of preventing moisture and other contaminants from entering enclosure 110, as will be described below.

Figure 3:
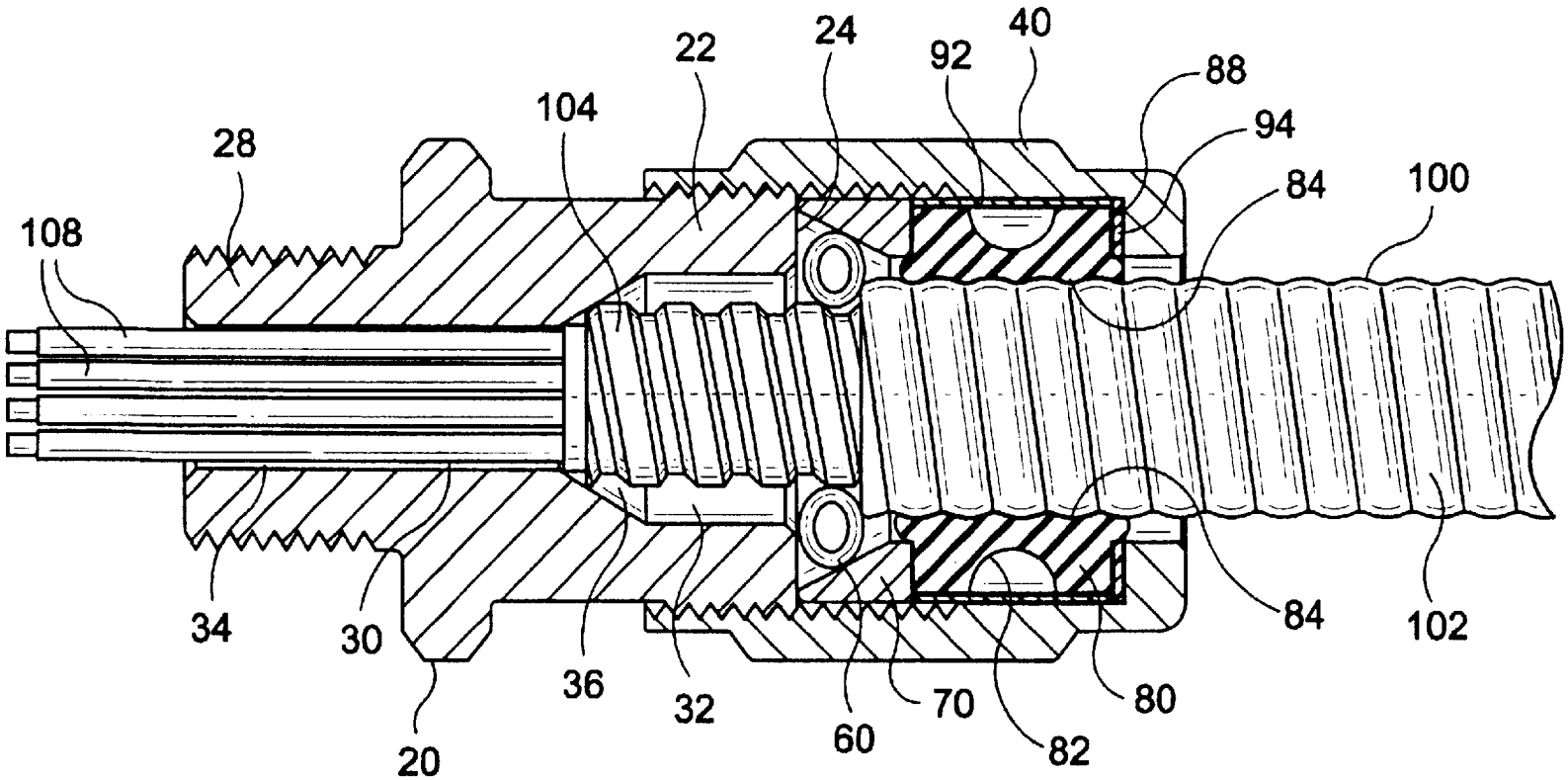
FIG. 3 is a cross-sectional view of the connector of FIG. 1 showing the connector in the secured position.

As shown in FIGS. 2 and 3, armored cable 100 is of the type commercially available and includes electrical conductors 108 encased in an internal polymer sheath 106 all of which is covered by a flexible armor casing 104. In addition, armor casing 104 may be covered by a plastic or rubber sheath 102 which prevents contaminants such as dirt or moisture from entering the cable and protects the armor casing 104 from corrosion. The construction of cable 100 allows it to be used in damp environments and where corrosive gases and elements are present. Such cables are available in a variety of sizes having various numbers and sizes of conductors in order to accommodate a variety of circuit requirements. Connector 10 may also be manufactured in a variety of sizes in order to accommodate the range of cable sizes. Referring again to FIGS. 1 and 2, the connector body 20 is of a generally unitary construction and is made of an electrically conductive material preferably aluminum or zinc plated steel. Body 20 is a generally annular body having an inner bore 30 extending longitudinally through the center of body 20. A front end 22 includes a substantially planar front surface 24. External threads 26 are formed about the body adjacent front end 22. Body 20 further includes a back end 28 which includes external threads 29 formed to cooperate with threads 112 formed on enclosure 110 thereby securing connector 10 to a structure 110 in a moisture and dust tight manner. When body 20 is attached to sheet metal enclosure, a locknut (not shown) can be used to secure the connector. Such structures 110 may include junction boxes, panel boards, motor control enclosures, electrical distribution equipment, and the like.

External threads 26 are formed to cooperate with and secure gland nut 40 to body 20. Gland nut 40 is preferably an annular hollow housing having a side wall 44 extending upwardly from a back wall 46. The inner surface of gland nut side wall 44 includes threads 48 formed adjacent gland nut front end 50. Gland nut threads 48 cooperate with external threads 26 formed on connector body 20 thereby allowing gland nut 40 to be securing to the connector body. In addition, gland nut back wall 46 includes an aperture 52 formed therethrough to allow the passage of armored cable 100 into connector 10.

In a preferred embodiment, body 20 and gland nut 40 are formed from generally hexagonal or octagonal stock. Parts are preferably machined in a manner well known to those skilled in the art. Forming of threads 26 and 29, 48, and the desired openings can be done while leaving portions of the hexagonal or octagonal stock intact lower as locations where the connector may be engaged for tightening the connector into the enclosure and/or tightening gland nut 40 onto body 20.

Figure 4B:
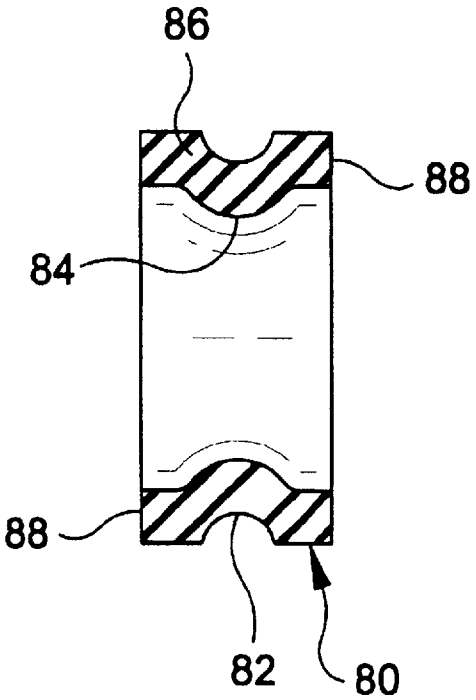
FIG. 4b is a cross-sectional view showing the sealing ring of FIG. 4a in a compressed state.
Figure 4A:
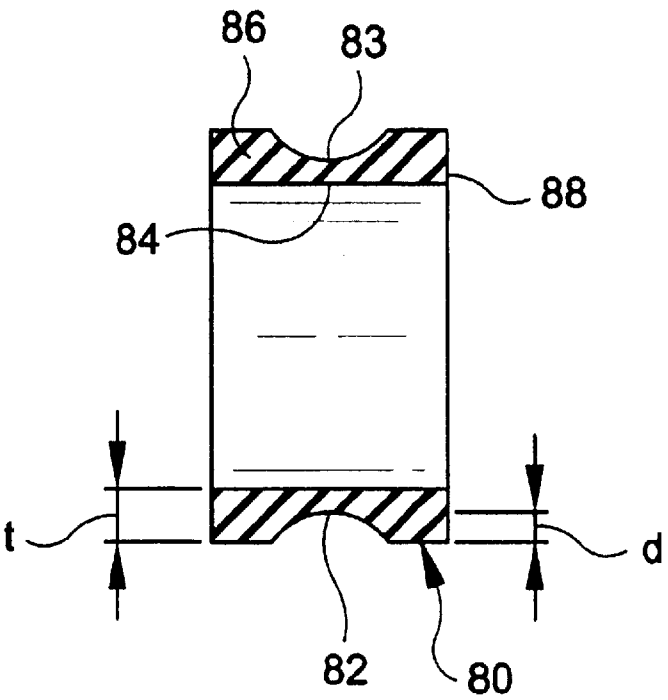
FIG. 4a is a cross-sectional view showing the sealing ring of the present invention in an uncompressed state.

Referring additionally to FIG. 4a, connector 10 further includes an annular sealing ring 80 formed of a deformable elastomeric material such as neoprene or other rubber-like elastomeric material. Sealing ring 80 is sized to fit within gland nut 40 and may be positioned adjacent back wall 46. Sealing ring 80 includes a side wall 86 extending between two planar end walls 88. Sealing ring 80 preferably includes, a U-shaped annular groove 82 extending about the outer surface of side wall 86, as shown in FIGS. 2 and 4a. Sealing ring 80 has an inner diameter surface 84 which is substantially uniform in an uncompressed state and is sized to allow the passage of armored cable 100. Groove 82 permits the sealing ring's inner diameter to be radially contracted a significant amount when sealing ring 80 is axially compressed as shown in FIG. 4b. Upon such axial compression, inner diameter surface 84 deflects radially inward and is brought into physical sealing engagement with armored cable 100 thereby providing a moisture and dust tight seal between cable 100 and connector 10. Sealing ring 80 is shown in its relaxed uncompressed state in FIG. 4a.

In order to permit for sufficient contraction of the inner diameter of sealing ring 80, groove 82 preferably has a depth, d, at least ½ the wall thickness, t, when in the uncompressed state. With such a depth, the side wall thickness at the bottom 83 of groove 82 is thin enough to permit a wide range of radial deflection. By permitting such a range of radial deflection, connector 10 is capable of accommodating a relatively wide range of cable sizes as described below.

A beveled washer a ring 70 may be placed within gland nut 40 adjacent sealing ring 80, as shown in FIG. 2. Beveled washer 70 preferably has an outside diameter equal to or less than the outside diameter of sealing ring 80. Beveled washer 70 has a generally inward beveled surface 72 on one side and a generally planar surface 74 forming the opposing side surface. Beveled washer 70 is preferably positioned within gland nut 40 such that planar surface 74 is adjacent sealing ring 80. Planar surface 74 may be brought into formed engagement with sealing ring 80 resulting in the axial compression of sealing ring 80 in a manner which will be described in detail below.

As shown in FIGS. 2 and 3, beveled surface 72 forms a seat for spring 60. Spring 60 is preferably a coil spring which is deformable to form a generally circular structure. Spring 60 is preferably formed of an electrically conductive material and has an operative position such that it is in electrical contact with the armored casing 104 of armored cable 100 and with gland nut 40, as shown in FIG. 3. Spring 60 provides electrical continuity for grounding the armored cable through the connector 10.

Referring to FIG. 3, gland nut 40 may be threaded onto connector body 20 so that the length of the connector is telescopically reduced and the various components within gland nut 40 are compressed. More specifically, connector body planar surface 24 engages spring 66 which is then driven into its beveled seat causing the spring's diameter to constrict thereby bringing spring 60 into electrical and physical contact with cable armor 104. In addition, upon securement of gland nut 40 onto body 20, beveled washer 70 is urged against sealing ring 80. This results in axial compression of sealing ring 80 which in turn causes the inside diameter of sealing ring 80 to diametrically contract. The inside diameter 84 is, therefore, brought into sealing engagement with the armored cable sheath 102 thereby providing a moister tight and dust tight seal.

Since groove 82 allows for significant diametrical contraction of sealing ring 80, a relatively wide range of cable sizes may be properly accommodated and sealed within a particular size connector. For example, a connector of the prior art may require 12 different sizes in order to accommodate a range of cable outer diameters from 0.50 inches to 2.620. In contrast, a connector type formed in accordance with the present invention can properly accommodate such a cable range with only 7 connector sizes. Therefore, a manufacturer needs only produce a relatively small number of connector sizes in order to accommodate the wide range of commercially available cable sizes. In addition, a distributor is not burdened with stocking a wide assortment of connectors. Accordingly, the ability of connector 10 to accommodated a wide range of cable sizes results in considerable savings in manufacturing and distribution.

Connector 10 further includes a friction isolation assembly 90. In prior art connectors when the gland nut is threaded onto the connector body, the gland nut tends to rotate the sealing ring placed within. As the sealing ring is brought into engagement with the cable, the torque generated by the turning of the gland nut is imparted to the cable resulting in cable twisting which is undesirable. The amount of frictional force between the sealing ring and the cable is especially pronounced when the sealing ring is highly compressed. The present invention overcomes such problems by the inclusion of the friction isolation assembly 90 which substantially isolates sealing ring 80 from gland nut 40 thereby reducing any transmission of torque to the cable.

Isolation assembly 90 preferably includes a thin walled cylinder 92 which is sized to receive sealing ring 80. Cylinder 92 has a length preferably equal to or slightly larger than the axial length of sealing ring 80 so that the entire side wall 86 of the sealing ring is covered, as shown in FIG. 2. Cylinder 92 also preferably has an inside diameter which is slightly larger than beveled washer 70. Therefore, beveled washer 70 may extend within cylinder 92 to permit axial compression of sealing ring 80, as described above.

Isolation assembly 90 also preferably includes a planar washer 94 which is insertable within gland nut 40 such that it sits between gland nut end wall 46 and the adjacently disposed sealing ring end wall 88. Accordingly, washer 94 frictionally isolates sealing ring end wall 88 from gland nut back wall 46.

Cylinder 92 and washer 94 are preferably formed of a smooth polymer material such as nylon. The isolation assembly 90 greatly reduces the friction between gland nut 40 and sealing ring 80 by providing a low friction barrier surface which allows gland nut 40 to be rotated substantially independently of sealing ring 80. Therefore, upon securing gland nut 40 to body 20, no significant amount of torque will be imparted to sealing ring 80 or cable 100 thereby eliminating cable twisting.

In an alternative embodiment (not shown), the sealing ring side wall 86 and end wall 88 may include friction reducing material molded therein.

The operation of connector 10 will now be described. In order to attach an armored cable 10 to an enclosure or other structure 110, connector body 20, with gland nut 40, spring 60, beveled ring washer 70, sealing ring 80 and isolation assembly 90 all relatively loosely connected thereto, is screwed into an opening in the enclosure using threads 29. Armored cable 100 is inserted through aperture 52 in gland nut 40 and through bore 30 in connector body 20. In a preferred embodiment shown in FIG. 3, inner bore 30 includes a large diameter portion 32 and a small diameter portion 34 connected by a beveled cable stop 36. Large diameter portion 32 extends from front end 22 to cable stop 36 and small diameter portion 34 extends from cable stop 36 to back end 28. The free end of cable 100 inserted into connector 10 abuts cable stop 36. Preferably, the end of armor casing 104 will abut cable stop 36. It will be appreciated that the outer diameter of armor casing 104 will preferably, but not necessarily, be larger than the diameter of small diameter portion 34 of bore 30. The conductors 108 of cable 100 extend past cable stop 36, through small diameter portion 34 and exit connector 10 through back end 28.

Once cable 100 is fully inserted, gland nut 40 may be tightened, thereby compressing spring 60, beveled washer 70 and sealing ring 80 to insure the desired electrical connection and seal. Upon tightening of the gland nut 40, gland nut back wall 46 urges against one of the sealing ring end walls 88. The front surface 24 of body 20 urges spring 60 and beveled washer 70 into the other end of sealing ring 80 thereby axially compressing sealing ring 80 causing diametrical contraction thereof. In addition, the compression of spring 60 between connector body front surface 24 and beveled surface 72 of beveled washer 70 pushes spring 60 against cable 100, which holds cable 100 tightly within connector 10 thereby increasing cable pullout resistance.

As the sealing ring 80 is compressed, its side wall 86 and end wall 88 is retained between cylinder 92 and washer 94 respectively. Due to the minimal friction between gland nut 40 and cylinder 92 and washer 94, no significant amount of torque will be transmitted to cable 100. Therefore, as sealing ring 80 grips cable 100, gland nut 40 will rotate independently of cylinder 90 and sealing ring 80.

It will be appreciated that once connector 10 is in place in the enclosure and secured thereto, only gland nut 40 needs to be tightened to provide the necessary compression to achieve the desired electrical connection, dust and water seal and cable pullout resistance.

Whereas, particular embodiments of this invention have been described for purposes of illustration, it will be evident to those skilled in the art that numerous variations may be made without departing from the invention as described in the claims.

We claim:

1. A connector for an armored cable comprising:

a connector body having a generally longitudinal opening extending therethrough and having a first end;

a gland nut telescopically engageable with said first end of said connector body, said gland nut having a first end, said gland nut first end having an aperture adapted to receive the armored cable;

a sealing ring positionable within said gland nut and having an inner annular surface engageable with the armored cable for sealing about an opposed outer annular surface of the armored cable, said sealing ring further including a side wall extending between two opposed end walls;

and a cylinder having an uniform diameter and a length equal to or greater than a length of said sealing ring, said sealing ring being positioned within said cylinder such that said side wall is covered by said cylinder, whereby said sealing ring side wall is isolated from said gland nut by said cylinder thereby permitting said gland nut to rotate substantially independently of said sealing ring.

2. A connector as defined in claim 1, further including a washer positioned between said gland nut and one of said two end walls of said sealing ring.

3. A connector as defined in claim 2, wherein said cylinder and said washer are formed of a polymer material.

4. A connector as set forth in claim 1, wherein said first end of said connector body has threads and said gland nut has an inner surface having a threaded portion, whereby said gland nut is threadedly engageable with said first end of said connector body.

5. A connector as defined in claim 4, wherein said connector body and said gland nut are formed of an electrically conductive material.

6. A connector as defined in claim 1, further including a generally circular, electrically conductive spring positioned within said gland nut, said spring having an operative position in which said spring contacts the armored cable and said connector body.

7. A connector as defined in claim 6, a beveled washer having a first generally planar end and a second opposed end having an inwardly beveled surface, said beveled surface forming a seat for supporting said spring; and when said gland nut is threaded onto said body first end engages said spring forcing it into said beveled seat thereby bringing said spring into mechanical and electrical contact with the armored cable.

8. A connector as defined in claim 1, wherein said sealing ring has an annular groove formed about an outer surface thereof, said groove permitting said sealing ring to diametrically contract upon axial compression of said sealing ring.

9. A connector for an armored cable comprising:

a connector body having a generally longitudinal opening extending therethrough having a first end;

a gland nut telescopically engageable with said first end of said connector body, said gland nut including a first end having an aperture adapted to receive the armored cable;

a sealing ring positioned within said gland nut and having an annular side wall bounded by a first and second opposed end walls, a portion of said side wall including a deformable portion, said deformable portion of said side wall including an annular groove extending about a radially outer portion of said side wall, said groove being configured to permit said deformable portion to deflects radially inward toward said armored cable upon compression of said first and second end walls thereby being adapted to engage the armored cable for sealing about the armored cable; and a means for axial compressing said sealing ring.

10. A connector as defined in claim 9, wherein said groove is generally U-shaped.

11. A connector as defined in claim 10, wherein said sealing ring in an uncompressed state includes a substantially uniform inner diameter.

12. A connector as defined in claim 9, wherein said groove has a depth extending radially inward at least ½ a thickness of said side wall.

13. A connector as defined in claim 9, wherein said means for axially compressing said sealing ring includes an annular member disposed adjacent said sealing ring and being engageable therewith, said annular member axially compressing said sealing ring when said gland nut and said connector body are telescopically engaged.

14. A connector as defined in claim 13, wherein said gland nut further includes threads formed on an inner surface thereof and said connector body includes threads formed on an outer portion thereof, said threads on said gland nut positioned to engage and cooperate with said threads on said connector body, such that upon threaded engagement of said gland nut onto said connector body said annular member engages and axially compresses said sealing ring.

15. A connector as defined in claim 13, further including a generally circular conductive spring positioned within said gland nut contacts said connector body and the armored cable.

16. A connector as defined in claim 15, wherein said annular member includes a first and second opposed sides, said first side having a generally inwardly beveled surface forming a seat to support said spring, said second surface being generally planar and positioned adjacent said sealing ring.

17. A connector as defined in claim 15, further including a friction isolation assembly, said assembly including a cylinder positioned about an outer diameter of said sealing ring thereby substantially isolating said sealing ring outer diameter from said gland nut.

18. A connector as defined in claim 17, wherein said sealing ring first end wall is disposed adjacent said gland nut first end and wherein said isolation assembly further includes a generally annular washer disposed within said gland nut between said glad nut first end wall and said sealing ring first end thereby isolating said sealing ring first end wall from said gland nut.

19. A cable connector comprising:

a connector body having a generally longitudinal opening extending therethrough and having a first end;

a gland nut telescopically engageable with said first end of said connector body, said gland nut having a first end, said gland nut first end having an aperture for receiving the cable;

a sealing ring positionable within said gland nut and having an inner annular surface adapted to engage the cable for sealing about an outer annular surface of the cable, said sealing ring having an annular groove formed about an outer surface thereof, said groove being configured to permit said sealing ring to diametrically contract upon axial compression of said sealing ring; and at least one friction isolation surface disposed between said gland nut and a portion of said sealing ring for substantially frictionally isolating said sealing ring from said gland nut to permit said gland nut to rotate substantially independently of said sealing ring.

20. A connector as defined in claim 19, wherein said sealing ring includes an outer annular surface, said at least one friction insolation surface is disposed between said sealing ring outer annular surface and said gland nut.

21. A connector as defined in claim 19, wherein said sealing ring includes an end wall and said at least one friction insolation surface is disposed between said sealing ring end wall and said gland nut.

22. A cable connector comprising:

a connector body having a generally longitudinal opening extending therethrough having a first end;

a gland nut telescopically engageable with said first end of said connector body, said gland nut having a first end having an aperture adapted to receive the cable; and a sealing ring positioned within said gland nut and having an annular side wall bounded by a first and second opposed end walls, a portion of said side wall including a deformable portion, said deformable portion of said side wall including an annular groove extending about a radially outer portion of said side wall, said groove being configured to permit said deformable portion deflects radially inward toward the cable upon axial compression of said sealing ring resulting from telescopic engagement of said gland nut and said connector body, such that said deformable portion engages the cable for sealing about the cable.

23. A connector as defined in claim 22, wherein said gland nut and said connector body are threadedly engageable and are axially translatable toward each other upon said threaded advancement of said gland nut on said connector body, and wherein said threaded advancement of said gland nut on said connector body results in the axial compression of said sealing ring.

24. A connector as defined in claim 22, further including an annular member disposed adjacent said sealing ring and engageable therewith, said annular member urging said sealing ring into axial compression upon telescopically engagement of said gland nut and said connector body.

25. A connector as defined in claim 22, further including at least one friction insolation surface disposed between said gland nut and a portion of said sealing ring for substantially frictionally isolating said sealing ring from said gland nut.

26. A connector as defined in claim 22, wherein said sealing ring groove has a depth extending radially inward at least ½ a thickness of said side wall in order to permit said deflectable portion to bulge toward said cable.

27. A connector for an armored cable comprising:

a connector body having a generally longitudinal opening extending therethrough and having a first end;

a gland nut telescopically engageable with said first end of said connector body, said gland nut having a first end, said gland nut first end having an aperture adapted to receive the armored cable;

a sealing ring positionable within said gland nut and having an inner annular surface engageable with the armored cable for sealing about the armored cable on an opposed outer annular surface of the armored cable, said sealing ring including an annular groove formed about an outer surface thereof, said groove permitting said sealing ring to diametrically contract upon linear compression of said sealing ring;

an annular member disposed between said connector body and said sealing ring, said annular member being engageable with said sealing ring to bring said sealing ring into sealing engagement with the armored cable; and an isolating means positionable about said sealing ring for frictionally isolating an outer annular surface of said sealing ring from said gland nut and permitting said gland nut to rotate substantially independently of said sealing ring.

*28. A connector for terminating an electrical cable having an outer insulative sheath, an armor casing extending from said sheath and a plurality of conductors extending therefrom, said connector comprising:*

*a connector body having a cable insertion end, a conductor egressing end and a central longitudinal bore therethrough for insertably accommodating said cable;*

*a gland nut telescopically attachable to said cable insertion end of said body;*

*a spring ring supported by said body for surrounding engagement with said extending armor casing of said cable;*

*a sealing ring supported adjacent said gland nut for surrounding engagement with said insulative sheath of said cable; and*

*a washer interposed between said sealing ring and said spring ring having a forward surface engageable with said spring ring and an opposed rearward surface engageable with said sealing ring so as to urge said spring ring into conductive engagement with said armor casing of said cable upon said telescopic engagement of said gland nut with said cable insertion end of said body and to urge said sealing ring into seated engagement with said insulative sheath of said cable.*

*29. A connector of claim 28 wherein said washer forward surface is beveled to urge said spring ring said armor casing.*

*30. A connector of claim 29 wherein said beveled forward surface of said washer forms a seat for said spring ring.*

*31. A connector of claim 30 wherein said washer rearward surface includes a flat surface for engagement with said sealing ring.*

*32. A connector of claim 28 wherein said sealing ring has a generally annular configuration with a first end adjacent said gland nut and a second end adjacent said washer.*

*33. A connector of claim 32 wherein said washer has an outer diameter which is substantially equal to or less than the outer diameter of said second end of said sealing ring.*

*34. A connector of claim 28 wherein said sealing ring includes an inner annular surface adapted for sealing engagement with said cable sheath, said sealing ring having an annular groove on an outer annular surface, said groove being configured to permit it said sealing ring to diametrically contact into said sealing engagement with said cable sheath upon said telescopic engagement of said gland nut with said body.*

*35. A connector of claim 28 further including a friction isolation surface positioned between said gland nut and said sealing ring for substantially frictionally isolating said sealing ring from said gland nut to permit gland nut rotation with respect to said body.*

*36. An armored cable connector comprising:*

*a connector body having a generally longitudinal opening extending therethrough and having a first end;*

*a gland nut telescopically engageable with said first end of said connector body, said gland nut having a first end and an aperture adapted to receive said armored cable;*

*a sealing ring positionable within said gland nut and having an inner annular surface engageable with said armored cable;*

*a generally circular conductor spring positioned within said body, said spring having an operative position in which said spring contacts said armor cable; and*

*a washer interposed between said spring and said sealing ring, wherein upon said telescopic engagement of said gland nut with said body said washer engages said spring so as to force it into said engagement with said armored cable and substantially simultaneously urging said sealing ring into said engagement with said cable.*

*37. A cable connector of claim 36 wherein said washer includes a forward surface engageable with said spring and a rearward surface engageable with said sealing ring.*

*38. A cable connector of claim 37 wherein said washer forward surface is beveled to form a seat for accommodating said spring.*

*39. A cable connector of claim 38 wherein said washer rearward surface is flat.*

* * * * *